United States Patent
Kang et al.

(10) Patent No.: US 9,092,097 B2
(45) Date of Patent: Jul. 28, 2015

(54) TOUCH PANEL INCLUDING EACH TOUCH CONTROLLER FOR EACH DIVIDED REGION AND LIQUID CRYSTAL DISPLAY DEVICE USING THE SAME

(75) Inventors: Hee-Kwang Kang, Seoul (KR); Deuk-Su Lee, Goyang-si (KR); Su-Chang An, Seoul (KR); Sung-Su Han, Gyeongju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 571 days.

(21) Appl. No.: 12/900,198

(22) Filed: Oct. 7, 2010

(65) Prior Publication Data

US 2011/0141040 A1 Jun. 16, 2011

(30) Foreign Application Priority Data

Dec. 11, 2009 (KR) ........................ 10-2009-0123109

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01); *G06F 2203/04111* (2013.01); *G06F 2203/04808* (2013.01)

(58) Field of Classification Search
USPC .................................................. 345/173–178
See application file for complete search history.

(56) References Cited

U.S. PATENT DOCUMENTS

| | | | |
|---|---|---|---|
| 2003/0043113 A1 | 3/2003 | Itoh | |
| 2006/0097991 A1* | 5/2006 | Hotelling et al. | 345/173 |
| 2007/0138513 A1 | 6/2007 | Sato et al. | |
| 2008/0297174 A1* | 12/2008 | Narasimhan et al. | 324/663 |
| 2010/0085326 A1* | 4/2010 | Anno | 345/174 |
| 2010/0156811 A1* | 6/2010 | Long et al. | 345/173 |
| 2011/0025636 A1 | 2/2011 | Ryu et al. | |

FOREIGN PATENT DOCUMENTS

| | | |
|---|---|---|
| CN | 1987761 A | 6/2007 |
| CN | 101349955 A | 1/2009 |
| CN | 101398734 A | 4/2009 |
| JP | 2009-9249 A | 1/2009 |
| KR | 10-2009-0119600 A | 11/2009 |
| WO | WO 2009/145485 A2 | 12/2009 |

* cited by examiner

*Primary Examiner* — Dennis Joseph
(74) *Attorney, Agent, or Firm* — Birch, Stewart, Kolasch & Birch, LLP

(57) ABSTRACT

A touch panel includes a substrate comprising divided regions; first electrodes, each of the first electrodes comprising first rhombus patterns spaced apart a predetermined distance from each other in a predetermined first direction and first connection patterns configured to connect the first rhombus patterns second electrodes, each of the second electrodes comprising second rhombus patterns spaced apart a predetermined distance from each other in the second direction and second connection patterns configured to connect the second rhombus patterns; third electrodes formed in border areas between the divided regions and outer areas of the divided regions; a touch controller formed in each of the divided regions correspondingly; and pad electrodes connected with the touch controller.

11 Claims, 10 Drawing Sheets contact area: 1cm

TOUCH PANEL INCLUDING EACH TOUCH CONTROLLER FOR EACH DIVIDED REGION AND LIQUID CRYSTAL DISPLAY DEVICE USING THE SAME

CROSS REFERENCE TO RELATED APPLICATION

This application claims the benefit of the Korean Patent Application No. 10-2009-0123109, filed on Dec. 11, 2009, which is hereby incorporated by reference as if fully set forth herein.

BACKGROUND OF THE DISCLOSURE

1. Field of the Disclosure

The present invention relates to a touch panel, more particularly, to a touch panel having improved sensitivity embodied by applying divisional driving to a large-sized touch panel and changing a structure of a divided border area between divided areas while the divisional driving is implemented, and a liquid crystal display device including the touch panel.

2. Discussion of the Related Art

As the information age has started in earnest, a display field used to express an electrical information signal visually has been developed drastically. Together with that, a variety of flat display devices having excellent functions of slimming, reduced weights and low electricity consumption has been developed and they replace conventional cathode ray tube (CRT) devices rapidly.

Such a flat display device includes a liquid crystal display device (LCD), a plasma display panel device (PDP), a field emission display device (FED), an electro luminescence display device (ELD) and the like. They are commonly configured of a flay display panel to present images and this flat display panel has a couple of transparent insulating substrates boned with each other with a luminescent or polarizing material layer formed there between.

The liquid crystal display device (LCD) displays images by controlling light transmisivity of liquid crystal by way of an electric field. For that, the liquid crystal display device includes a liquid display panel having liquid crystal cells, a back light unit configured to emit lights to the display panel and a driving circuit configured to the liquid crystal cells.

A plurality unit pixel regions are defined and formed in the liquid crystal display panel by gate lines and data lines alternatively aligned to each other. At this time, each pixel region includes a thin film transistor array substrate, a color filter array substrate, a spacer located between the two substrates to maintain a cell gap and liquid crystal filled in the cell gap.

The thin film array substrate is configured of gate lines and data lines, a thin film transistor formed in each cross point of the gate and data lines as switch device, a pixel electrode connected with the thin film transistor with being formed in liquid crystal cell units, and an alignment layer coated thereon. The gate and data lines receive a signal from driving circuits via pad parts, respectively.

The thin transistor transmits a pixel voltage signal supplied to the data lines to the pixel electrode in response to a scan signal supplied to the gate lines.

The color filter substrate is configured of color filters formed in the liquid crystal cell units, a black matrix configured to distinguish color filters from each other and to reflect external lights, common electrodes configured to supply a reference voltage to each of the liquid crystal cells commonly and an alignment layer coated thereon.

After the thin film transistor substrate and the color filter array substrate fabricated independently as mentioned above are alignedly bonded to each other in opposite, the liquid crystal is injected and sealed.

Recently, such the liquid display device has been required to have a touch panel capable of recognizing a touch point inputted by a finger or auxiliary inputting means and of transmitting information corresponding to the touch. This touch panel is configured to be attached to an outer surface of the liquid crystal display device.

The touch panel may be categorized based on a touch sensing type into a resistance type, a capacitive type and an infrared sensor type. Recently, the capacitive type has been receiving attention to be applied to a compact sized model, in consideration of manufacturing convenience and sensitivity.

As follows, the capacitive type touch panel of related art will be described in reference to the accompanying drawing.

FIG. 1 is a plan view schematically illustrating the capacitive type touch panel of related art.

As shown in FIG. 1, the capacitive type touch panel of related art includes first electrodes 11 and second electrodes 12 aligned to each other on a substrate 10, a pad electrode 40 provided in a predetermined area of the substrate 10 to be connected with a flexible printed circuit (FPC) 50 including a touch controller 51. The first and second electrodes 11 and 12 are connected with the pad electrode 40 via a routing wire 25.

The first and second electrodes 11 and 12 may be aligned to each other in a bar shape, or they may be aligned in a rhombus pattern corresponding to sensing regions, respectively, as shown in FIG. 1, such that one electrode is formed to have a thin connection pattern integrally formed with a neighboring rhombus pattern and the other electrode is formed to electrically connect the neighboring rhombus pattern adjacent to the connection pattern with a connection metal pattern 21 of the other metal.

Here, the touch controller 51 may be a kind of an integrated circuit (IC) including input pins (not shown) as connecting parts of a driving part provided in the display device and output pins (not shown, which are in contact with the pad electrode) configured to apply signals to the first and second electrodes 11 and 12.

However, the touch controller 51 typically used at moment supports the number of pins (channels) proper to a compact-sized model. Especially, as demands of touch solution development with respect to a compact-sized model such as a mobile phone have been stronger in recent, most touch controller developers have developed the touch controller 51 proper to the compact models.

In the current market, demands of touch panel technology have been increasing more and more in industries of net books, NBPC (notebook PC) models and monitors. In contrast, development of touch controller IC proper even to a middle and large sized model has not accomplished yet. Because of that, considering touch resolution and photolysis, application of medium-and-large-sized models is impossible in the current IC development level.

FIG. 2 is a diagram illustrating comparison between an area of a predetermined sensing region and a contact area of an actual finger, when the capacitive type touch panel of related art is applied to a more-than-medium sized model.

For example, according to FIG. 2, the first and second electrodes are formed in the rhombus pattern, corresponding to the sensing regions, respectively. An electrode is formed to have the thin connection pattern integrally formed with a neighboring rhombus pattern and the other electrode is formed by electrically connecting the neighboring pattern with a connection metal pattern of another metal with respect to an intersection of the connection pattern.

In this case, currently commercialized IC of the touch controller has the fixed number of channels (pins). Because of that, as the size of the model is larger, the sizes of the first and second electrodes have to be larger for the sensing, corresponding to such the number of the channels.

According to FIG. 2, each diagonal line of the first and second electrodes provided for this sensing is approximately 1.5 cm in a single sensing region 31 of the touch panel presented to be proper to the number of the pins of the touch controller.

However, a critical dimension of a finger in a single touch area is approximately 1 cm. As this is applied to the structure shown in FIG. 2, the area of the sensing region is formed larger than the single touch area of the finger. If a minute region moves because of the finger touching, it is impossible to detect the minute moving and it is expected for touch sensitivity to be deteriorated.

Furthermore, the capacitive type touch panel of related art has a problem of impossible multi-touch.

FIGS. 3A and 3B are diagrams illustrating touching in a self capacitive type and detecting areas thereof.

As shown in FIG. 3A, for example, A(5a) and B(5b) points of a finger touches different areas simultaneously and then the self capacitive type applies a signal and detects the signal for all lines of the first electrodes (X electrodes) and second electrodes (Y electrodes). At this time, signal application and detection is implemented in the first electrodes and after that, signal application and detection is implemented in the second electrodes.

If the touch of the finger A(5a) and B(5b) implemented simultaneously, each of the first and second electrodes reads a changing value from lines where the finger A and B (5a and 5b) are located. As shown in FIG. 3B, crossing areas (G) of the lines where the finger A and B are located are recognized as touch, together with the actual touch Area®.

That is, the crossing rear (G) of the lines having the finger located therein is a ghost point, not the actual touch point, and this ghost phenomenon is getting severer as the number of the multi-touches is getting larger.

SUMMARY OF THE DISCLOSURE

The touch panel of related art mentioned above has following disadvantages.

First of all, the pin number of the touch panel controller commercialized currently is limited and the electrode number corresponding to the pin number is limited accordingly. Because of that, the presentation of the touch panel is possible only in a compact-sized model. If the touch panel controller is applied to a more-than-medium-sized model, the size of the sensing electrode has to be larger and the single sensing area of the sensing electrodes is larger than the area of actual single touch area. As a result, minute motion which occurs in the single sensing area fails to be sensed and touch sensitivity has to be deteriorated.

Furthermore, in case multi-touches are generated in the touch panel which is the self capacitive type, touch sensing is implemented by means of scanning of each line. Here, in case multi-touches located in different matrixes are generated, ghost touch happens to be recognized from crossing areas of the matrixes where actual touch is not generated.

Accordingly, the present invention is directed to a touch panel and a liquid crystal display device including the touch panel.

An object of the present invention is to provide a touch panel having divisional driving applied thereto to be embodied in a large-sized model, with improved sensitivity enabled by changing a structure of divided border area, and a liquid crystal display device including the touch panel.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch panel includes a substrate comprising a plurality of divided regions; a plurality of first electrodes, each of the first electrodes comprising first rhombus patterns spaced apart a predetermined distance from each other in a predetermined first direction and first connection patterns configured to connect the first rhombus patterns adjacent on the substrate, the plurality of first electrodes aligned in a second direction crossing the first direction; a plurality of second electrodes, each of the second electrodes comprising second rhombus patterns spaced apart a predetermined distance from each other in the second direction and second connection patterns configured to connect the second rhombus patterns adjacent, the plurality of second electrodes aligned in the first direction; a plurality of third electrodes formed in border areas between the divided regions and outer areas of the divided regions, each of the third electrodes formed of triangle patterns connected with each other; a touch controller formed in each of the divided regions correspondingly; and a plurality of pad electrodes connected with the touch controller, the pad electrodes formed correspondingly to the first electrodes, the second electrodes and the third electrodes formed in the divided regions of the substrate.

Oblique sides of the triangle patterns of the third electrodes may be opposed to the border areas or the outer areas of the divided regions.

The touch panel may further include a first routing line connected with one of the pad electrodes from a corner of a first rhombus pattern located in an end of each of the first electrodes aligned in the first direction; and a second routing line connected with one of the pad electrodes from a corner of a second rhombus pattern located in an end of each of the second electrodes aligned in the second direction.

The touch panel may further include a third routing line connected with an end of the third electrodes.

The third routing line may be connected with a vertex of the triangle pattern located in the end of the third electrodes.

The touch panel may further include a triangle pattern located in an end of the second electrodes, the triangle pattern adjacent to the outer areas of the divided regions.

The first connection patterns may be integrally formed with the first rhombus patterns; and the second connection patterns are metal patterns located in a different layer from the second rhombus patterns.

The first rhombus patterns and the first connection patterns of the first electrodes, and the second rhombus patterns of the second electrodes may be formed of transparent electrodes.

The first rhombus pattern and the second rhombus pattern have diagonal lines smaller than a critical value of a contact area when touch is generated, respectively.

The first rhombus pattern and the second rhombus pattern have diagonal lines of 1 cm or less, respectively.

The touch controller applies voltage signals to the first electrodes and the second electrodes sequentially in the divided region and detects change of voltage values to detect an area having a changed voltage value to be touched.

Or the touch controller applies driving voltages to the first electrodes and detects voltage signals from the second electrodes to detect touch and a touch point according to the detected change of the voltage signal.

The third electrodes are formed in parallel to the first electrodes.

The third electrodes are configured of triangle patterns spaced apart a predetermined distance from each other in a predetermined first direction in first and second regions adjacent to the border areas, with oblique sides opposed to the border areas and connection patterns integrally formed with each other to connect the triangle patterns with each other.

In case the substrate is divided into first to four regions, each of the third electrodes comprises first triangle patterns spaced apart a predetermined distance from each other, with oblique sides opposed to the border areas in the first direction, and connection patterns integrally formed with each other to connect the first triangle patterns adjacent, in neighboring border and the outer areas in the first direction; and wherein each of the third electrodes comprises a right-triangle pattern having a right included-angle with respect to the first to fourth regions to be connected with the first triangle patterns, in a center of the border areas of the first to fourth regions.

The touch panel may further include a second triangle-pattern connected with an end of the second rhombus pattern of each of the second electrodes in the border area of the second direction, with an oblique side opposed to the border and outer areas.

In another aspect of the present invention, a liquid crystal display device includes a liquid crystal panel comprising a liquid crystal panel comprising first and second substrates opposed to each other, with a liquid crystal layer filled between the first and second substrates; a substrate comprising a plurality of divided regions; a plurality of first electrodes, each of the first electrodes comprising first rhombus patterns spaced apart a predetermined distance from each other in a predetermined first direction and first connection patterns configured to connect the first rhombus patterns adjacent, the plurality of first electrodes aligned in a second direction crossing the first direction on a rear surface of the second substrate; a plurality of second electrodes, each of the second electrodes comprising second rhombus patterns spaced apart a predetermined distance from each other in the second direction and second connection patterns configured to connect the second rhombus patterns adjacent, the plurality of second electrodes aligned in the first direction on the rear surface of the second substrate; a plurality of third electrodes formed in border areas between the divided regions and outer areas of the divided regions, each of the third electrodes formed of triangle patterns connected with each other; a touch controller formed in each of the divided regions correspondingly; and a plurality of pad electrodes connected with the touch controller, the pad electrodes formed correspondingly to the first electrodes, the second electrodes and the third electrodes formed in the divided regions of the substrate.

According to the present invention, there are following advantageous effects.

First of all, in case the size of the touch panel is larger even when the touch controller (driving IC) having the limited pin number is used, the touch panel is local dimmed and independent touch controllers are provided in the divided regions respectively. A single sensing are of a sensing electrode is formed in a single touch area or less and the sensing electrodes are driven separately for the divided regions. As a result, the touch panel may be applicable to a large-sized model without deterioration of touch sensitivity.

Second, when more minute touch sensitivity is represented, the number of the touch controllers is increased to be formed in the divided regions correspondingly. As a result, touch resolution and a resolving power may be improved in a large-sized model.

Third, a routing line is further provided in the border areas and outer areas to be connected with the sensing electrodes and touch controllers. As a result, touch may be detected in the border areas and the outer areas of the panel and thus uniformity of touch sensitivity may be improved accordingly. In this case, the sensing electrodes are formed of rhombus patterns configured to connect neighboring sensing areas with the sensing electrodes, respectively. When an end of the sensing electrode is connected with the touch controller, a corresponding routing line is corresponding to a vertex of the rhombus pattern. As a result, without any change of configuration, it is possible to add the routing line.

Fourth, for example, the detection of the touch is implemented in the crossing areas of the scanning lines having voltage change generated in X-axis direction scanning lines and Y-axis direction scanning lines. Such the detection may have a ghost phenomenon sensing an area without touch as touch point in case of multi-touch is generated. However, according to the mutual capacitive type of the present invention, change of the predetermined area size is sensed and the ghost phenomenon may be prevented.

Fifth, according to the mutual capacitive type, one of X-axis and Y-axis direction electrodes is a driving voltage applying line and the other is a sensing voltage detecting line. In this case, the driving voltage applying line is located corresponding to the border area and triangle pattern electrodes in the border area are driving voltage applying lines and the other sensing voltage detecting lines are complete rhombus patterns located in all of the regions. This structure enables the electrode distance of the driving voltage applying lines to be shorter to reduce the RC time constant structurally and it enables the sensing voltage detecting lines to have uniformly maintained mutual capacitance in an initial state. As a result, in case touch is generated, the lowest vale of the mutual capacitance in a touch generating area is calculated to detect touch more precisely.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, a touch panel according to the present invention and a liquid crystal display device including the same will be described in reference to the accompanying drawings.

Figure 1:
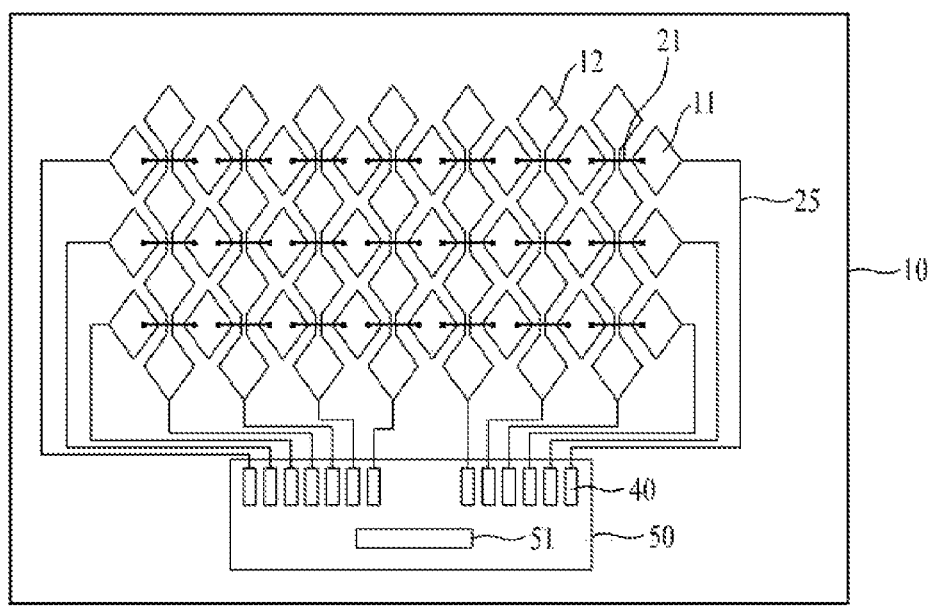
FIG. 1 is a plan view schematically illustrating a capacitive type touch panel of related art.
Figure 2:
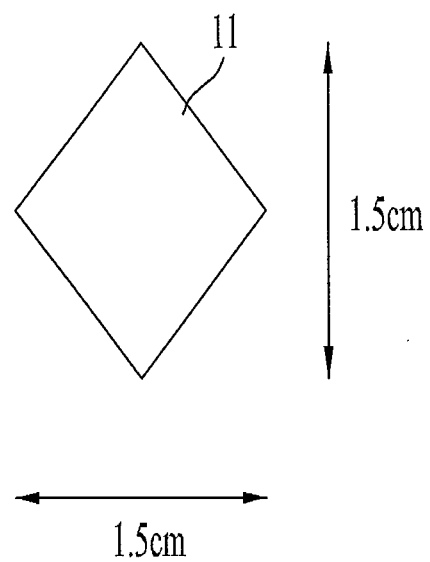
FIG. 2 is a diagram illustrating a contact area between a single sensing area and an actual finger, when the capacitive type touch panel of related art is applied to a large-sized model.
Figure 2:
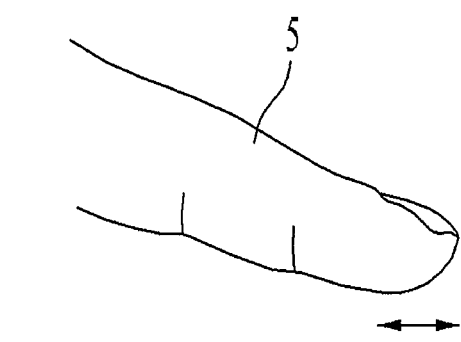
Figure 3A:
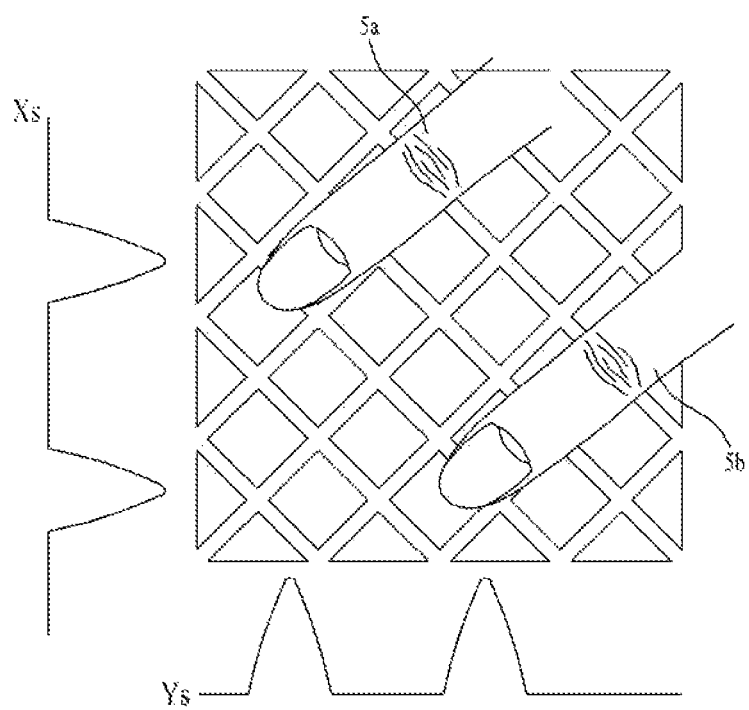
FIGS. 3A and 3B are diagrams illustrating a detecting area in case touch is generated in a self capacitive type.
Figure 3B:
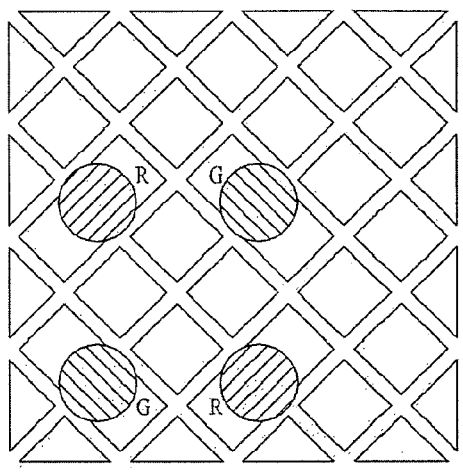
Figure 4:
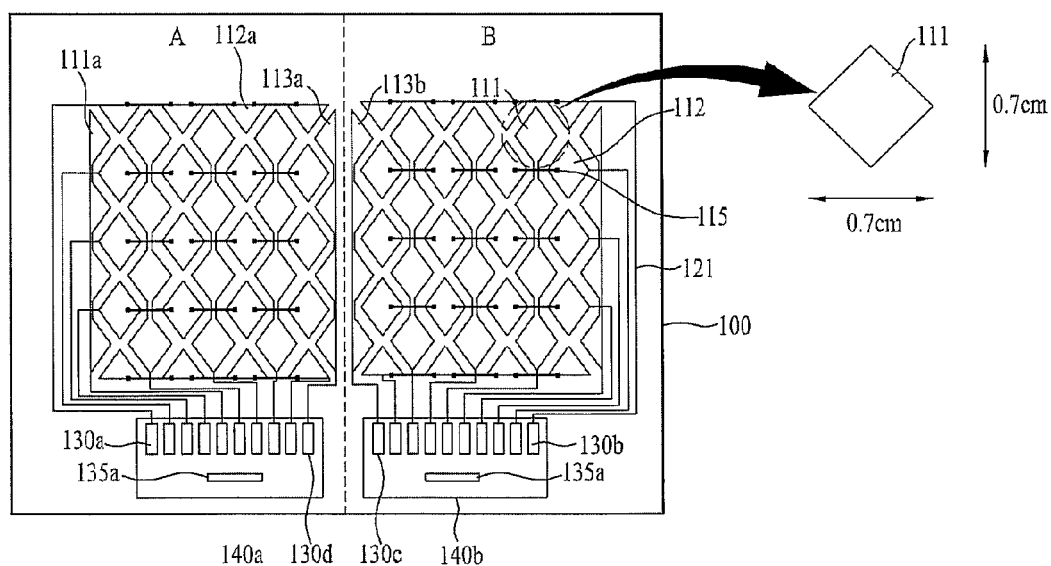
FIG. 4 is a plan view illustrating a plan view illustrating a touch panel according to a first embodiment of the present invention and an example in which divisional driving is applied to a touch panel of related art.

FIG. 4 is a plan view illustrating a touch panel according to a first embodiment of the present invention and illustrating an example of a touch panel of related art having divisional driving applied thereto.

As shown in FIG. 4, the touch panel according to the first embodiment of the present invention includes first and second electrodes 111 and 112 crossingly aligned to each other on a substrate, at least two touch controller 135a and 135b formed in at least two divided regions (A and B) on the substrate 100 correspondingly to control applied signals and detected signals of the first and second electrodes 11 and 112 located in the divided regions correspondingly, a routing line 121 configured to connect the at least two touch controllers 135a and 135b with the first and second electrodes 111 and 112, and pad electrodes 130a and 130b connected with the routing line 121 and the at least two touch controllers 135a and 135b.

The touch controllers 135a and 135b are directly connected with the pad electrodes 130a and 130b via independent flexible printed circuits (FPC) 140a and 140b, respectively. The FPCs 140a and 140b are connected with a driving part (not shown) of a display panel in which the touch panel is placed. This is implemented for the touch panel to be controlled by driving of the display panel.

According to FIG. 4, the substrate 100 is divided into two regions and it is possible to divide the substrate 100 into more than two regions. In this case, the increased regions are formed with corresponding FPCs including the touch controllers (driving ICs), respectively.

The first electrodes 111 includes first rhombus patterns of transparent electrode elements which are spaced apart from each other with respect to a predetermined first direction (Y axis direction) and connection patterns integrally formed with the first rhombus patterns to connect neighboring first rhombus patterns with each other. The second electrodes 112 includes second rhombus patterns of transparent electrode elements which are spaced apart from each other with respect to a second direction (X axis direction) crossed with the first direction, respectively, and metal patterns 115 located in a different layer from the second rhombus patterns to connect neighboring second rhombus patterns with each other.

Here, border first electrodes formed in a connected-triangle shape having a border area of the divided regions as opposite oblique side are further formed in the border area of the divided regions (A and B), passing a predetermined first direction with respect to border area. The border first electrodes 113a and 13b are connected with the touch pad electrodes 130d and 130c via the routing line to be connected with the FPCs 40a and 140b. As shown in the drawings, the border first electrodes 113a and 113b are divided because of divisional driving of the A and B regions to receive electrical signals from the corresponding FPCs 140a and 140b, respectively.

there are further formed a first outer pattern 111a or second outer pattern 112a which includes triangle patterns spaced apart from each other, with oblique sides opposed to sides of an outer regions of the touch panel, and connection patterns configured to connect the triangle patterns with transparent electrodes integrally formed with the triangle patterns or metal connection patterns formed in a different layer.

The reason why the first electrode outer pattern 111a or the second electrode outer pattern 112a and the border first electrodes 113a and 113b are formed in the outer region and the border area of the divisional driving regions is that touch has to be sensed in these areas.

To apply driving voltage signals of such the electrodes, ends of the first electrodes 111, the border first electrodes 113, the first electrode outer patterns 111a are connected with the pad electrodes 130a and 130b via the routing line 121. Ends of the second electrodes 112 and the second electrode outer patterns 112a are connected with the pad electrodes 130a and 130b via the routing line 121.

In this case, corners of the last rhombus patterns of the first and second electrodes 111 and 112 and the border first electrodes 113 may contact with the routing line 121. Ends of the last triangle patterns of the first electrode outer pattern 111a and the second electrode outer pattern 112a may contact with the routing line 121.

In the meanwhile, the first electrodes 111, the border first electrodes 113a and 113b and the first electrode outer patterns 111a and the second electrodes 112 and the second electrode outer patterns 112a may be contact with different routing lines 121, to be connected with corresponding pad electrodes, respectively.

The first and second rhombus patterns of the first and second electrodes 111 and 112 may have a predetermined length of a diagonal line smaller than a critical value of a contact area in case of a single touch. For example, each of the first and second rhombus patterns may have a diagonal line of 1 cm or less.

According to the accompanying drawing, the size of the single rhombus pattern functioned as single sensing electrode of the first and second electrodes is represented, with a diagonal line of 0.7 cm.

A critical value of a single touch area of the finger is approximately 1 cm. here, if the diagonal line of the rhombus pattern is determined smaller than 1 cm, touch detection may be enabled without any sensitivity deterioration. It is preferable that the diagonal line is 0.7 or less.

At least two touch controllers applies voltage signals to the first electrodes 11, 111a and 113 and the second electrodes 112 and 112a sequentially. After that, the touch controllers detect changes of voltage values to detect the voltage-value changed area as touch area.

The FPCs 140a and 140b are spaced apart a predetermined distance from each other and the substrate 100 includes at least two divided regions. Because of that, the touch controllers 135a and 135b may apply voltage signals to the first and second electrodes 111 and 112 of the regions and they may detect changes of the applied voltage signals.

Depending on cases, even when the divisional driving is implemented, the voltage signals may be applied to the first and second electrodes in the order of the regions, without dividing the divisional driving regions.

For example, in reference to FIG. 4, the voltage signals are applied to the second electrodes 112a, 112 and 112a located in A and B regions and after that, the voltage signals are applied to the first electrodes 111a, 111 and 111a located in the border area between A and B regions and the border area. Here, sensing for each electrode is implemented sequentially. This is a self capacitive type sensing configured to sense touch for each line. In case the self capacitive type sensing is implemented, the border first electrodes 113a and 113b located in the center may be connected with the FPCs 140a and 140b located in A and B regions, such that continuous signal application may be enabled in each region separately.

Figure 5:
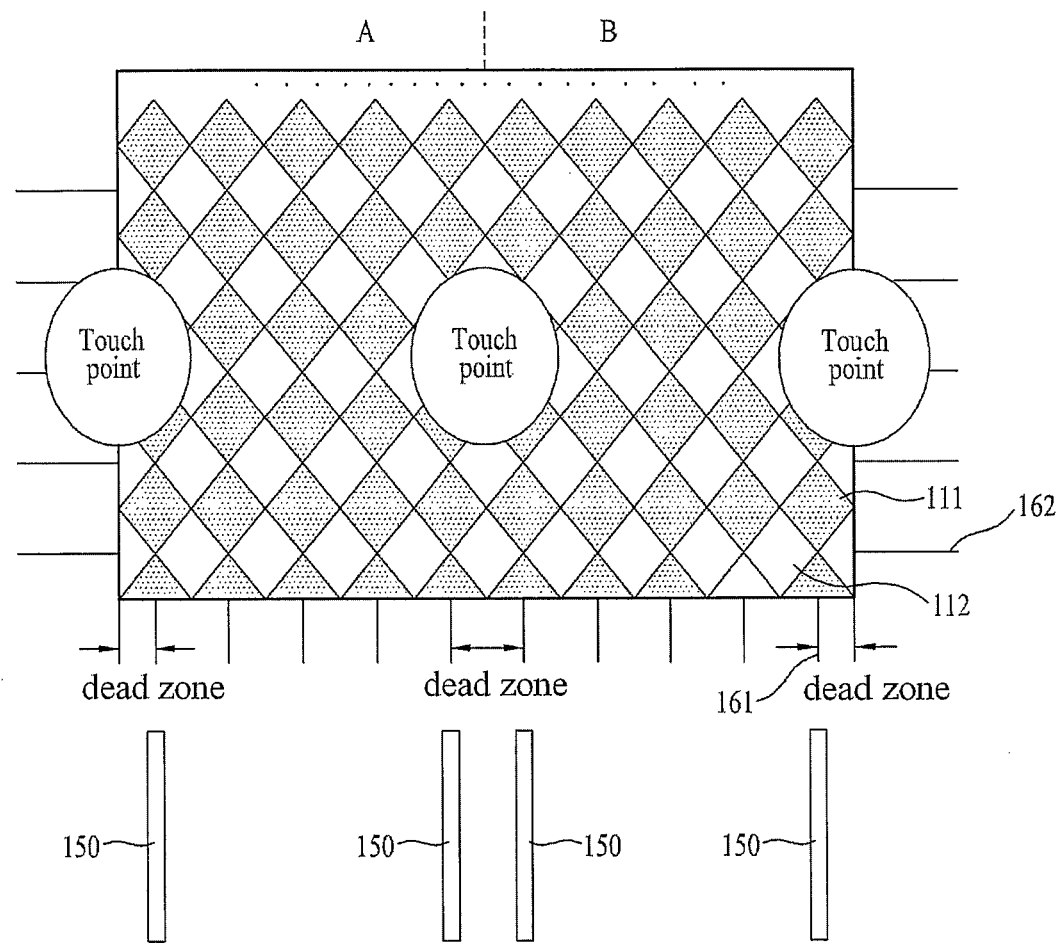
FIG. 5 is a plan view illustrating a dead zone generated in the touch panel having the divisional driving applied thereto.

FIG. 5 is a plan view illustrating a dead zone generated in the touch panel having the divisional driving applied thereto.

According to the touch panel having the divisional driving applied thereto by using a substrate divided into two regions, the routing lines 161 and 162 are applied with respect to the center of the first and second electrodes 111 and 112 as shown in FIG. 5. When an outer line located in a left side of A region is a touch point, only the voltage application to the second electrode is implemented in the outer triangle pattern, without the voltage application to the first electrodes, and touch may not be detected in this area.

When an outer line located in right side of B region is a touch point, touch cannot be detected in the outer triangle pattern electrodes because of the same reason mentioned above. As a result, the outer lines of A and B regions may be a dead zone in which touch cannot be detected.

Since the routing line is not connected with the first electrodes located in the border area between A and B regions, the area of the first electrodes located in the corresponding border area may be a dead zone in which touch cannot be detected.

A numeral reference 150 with no description is the pad electrode 150 and the routing lines 161 and 162 are connected with the pad electrode 150.

Figure 6:
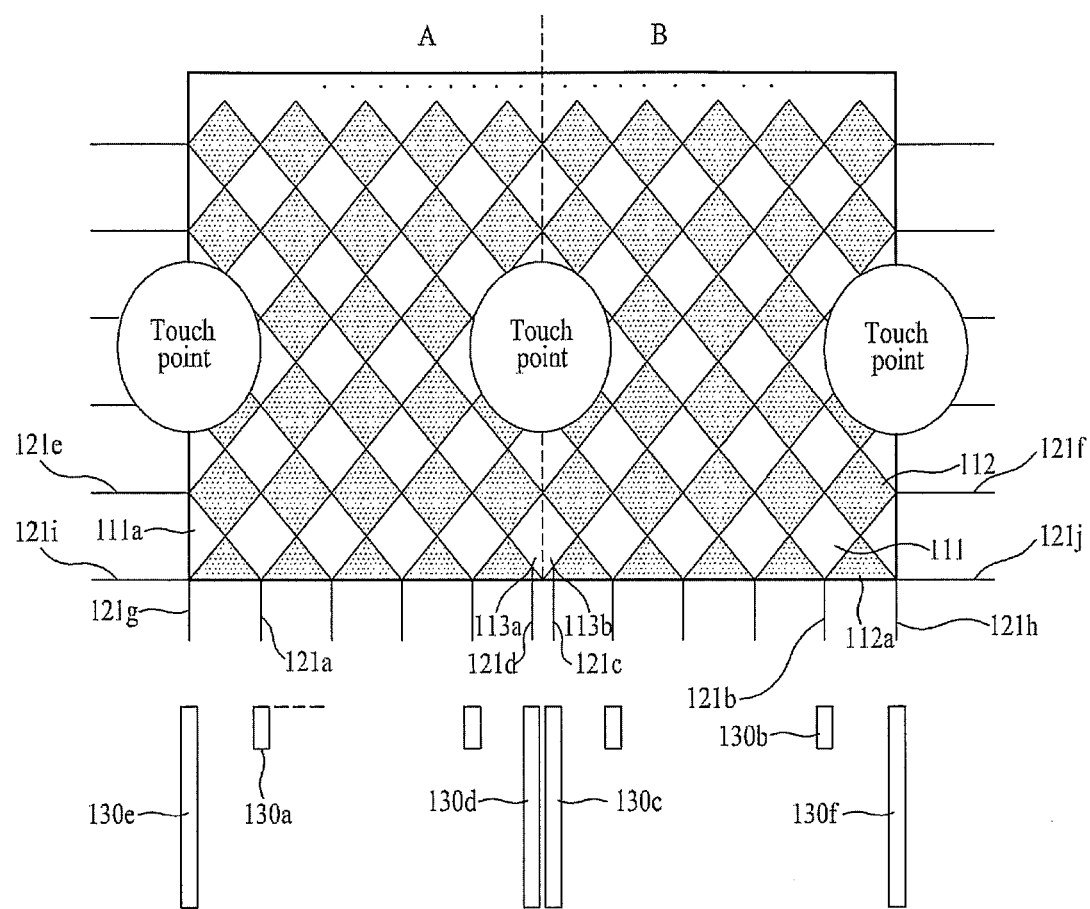
FIG. 6 is a plan view illustrating routing lines of the touch panel shown in FIG. 4.

FIG. 6 is a plan view illustrating the routing lines of the touch panel shown in FIG. 4.

According to FIG. 6, not to generate the dead zone shown in FIG. 5, the first electrodes located in the other regions except the border area are connected with the pad electrodes 130a and 130b located in A and B regions, respectively, via the routing lines 121a and 121b and the second electrodes 112 located in the other regions are connected with the pad electrodes 130a and 130b via the routing lines 121e and 121f. The first electrodes 113a and 113b located in the border area between A and B regions are connected with the border area pad electrodes 130d and 130c via the routing lines 121d and 121c.

In the structure mentioned in the first embodiment, the electrodes are provided in the border area of the regions and the outer region and the routing lines connected with those electrodes are formed. At this time, the voltage signals are applied to those electrodes to enable touch to be detected in all of the regions.

The first electrode outer pattern 111a of the predetermined first direction (Y-axis) located in the outer area of A and B regions may be connected with the outer pad electrodes 130e and 130f via routing lines 121g and 121h.

The second electrode outer pattern 112a of the second direction (Y-axis) located in the outer area of the A and B regions may be connected with outer pad electrodes (not shown) via routing lines 121i and 121j.

The routing line structure of FIG. 6 mentioned above is applicable to the present invention driven in a self capacitive type. When touch is generated in a predetermined area by inputting means such as a finger under the structure designed for the X-axis electrodes (the second electrodes) and the Y-axis electrodes (the first electrodes) to be overlapped with each other, a new capacitive is generated in a contact area generated by the finger and it is detected from the increased capacity whether there is touch.

The touch panel according to the first embodiment of the present invention is driven in a capacitive type configured to present touch coordinates based on changes of capacitance before and after the touch of the finger.

Such the capacitive type may be classified into a self capacitive type and a mutual capacitive type. The above touch panel may be applicable to both of the self capacitive type and the mutual capacitive type.

Figure 7:
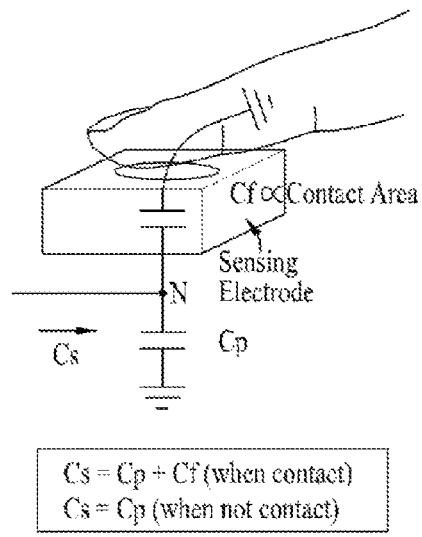
FIG. 7 is a diagram illustrating the touch panel applied to a self capacitive type driving.

FIG. 7 is a diagram illustrating the touch panel driven based on the self capacitive type driving configuration.

As shown in FIG. 7, the self capacitive type touch panel according to the present invention may sequentially implement voltage signal application and change detection for the first electrodes alternatively aligned to the second electrodes and it may implement voltage signal application and change detection for the second electrodes. That is, the first electrodes are scanned and then the second electrodes are scanned continuously and sequentially.

At this time, the above scanning enables a voltage to be applied to one of the electrodes located in crossing areas of the first and second electrodes. Because of that, difference of the voltages applied to the electrodes overlapped with each other may get an initial capacitance (Cp) when not in contact.

If touch generated by the inputting means such as a finger and a pen is applied to the first electrode or the second electrode (hereinafter, the electrode having touch applied thereto is referenced to as sensing electrode), a touch capacitive (Cf) is formed between the finger and the sensing electrode. At this time, the finger or pen may be assumed to be a ground.

After that, a total capacitance (Cs=Cp+Cf) calculated after adding up an initial capacitance (cp) configured in parallel and a touch capacitive (Cf) is applied to the sensing electrode having the touch which is a node 'A'.

Such the capacitive change is read according to the result of touch detection and the scanning of the first and second electrodes. A predetermined point having the change is detected as touch. That is, such the self capacitive type compares the initial capacitance with the changed capacitive and it detects touch based on detection of the increased capacitive by the touch.

In case the touch panel according to the first embodiment of the present invention is the self capacitive type configured to use a change of overlapped capacitance between the first and second electrodes. The changed capacitive may be variable according to an overlapped area between the first and second electrode in the sensing point. That is, if the area of the first and second electrodes is large, the initial capacitance (Cp) may be large with little capacitance change before and after touch. Because of that, touch sensitivity deterioration may occur. In case of the self capacitive type, the area of the first and second electrodes may be smaller and smaller and touch sensitivity may be better and better.

Figure 8:
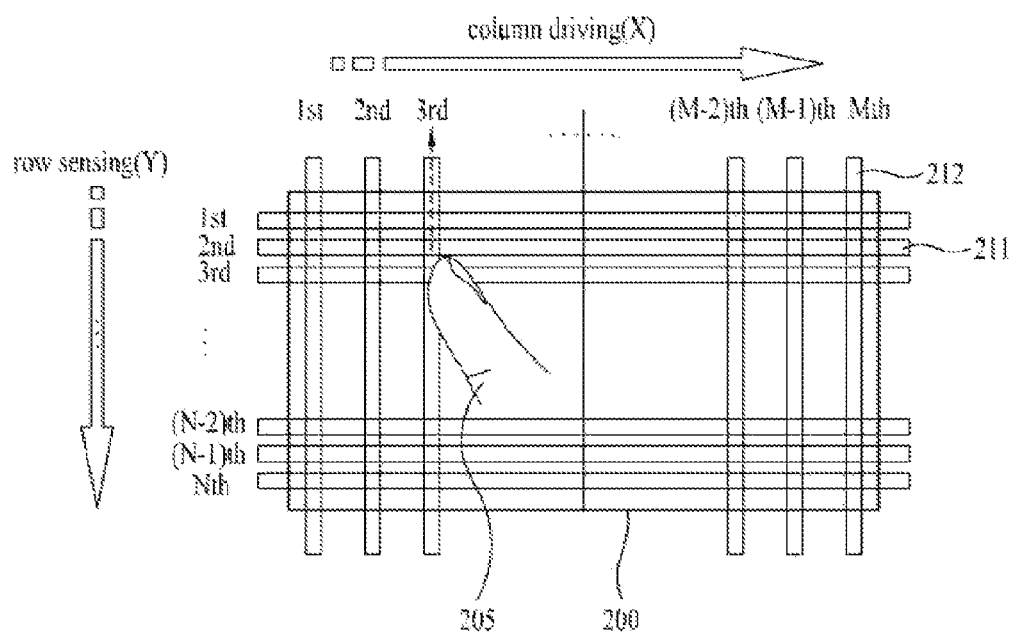
FIG. 8 is a diagram illustrating the touch panel applied to a mutual capacitive type driving.
Figure 9:
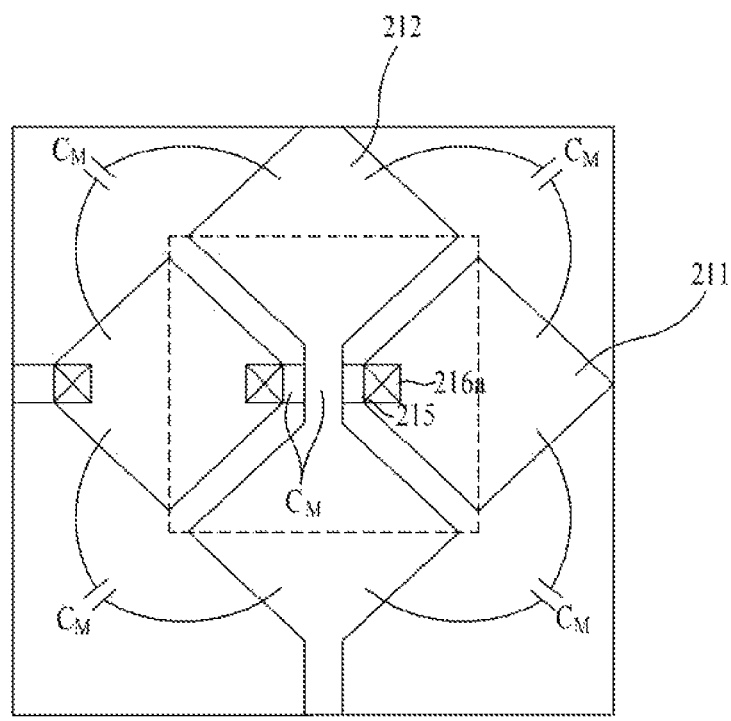
FIG. 9 is a plan view illustrating electrode crossing areas and neighboring areas when the mutual capacitive type is applied to the touch panel as shown in FIG. 8.

FIG. 8 is a diagram illustrating the touch panel having the mutual capacitive type driving configuration applied thereto. FIG. 9 is a plan view illustrating an electrode crossing area and a peripheral area when the mutual capacitive type driving is applied to the touch panel.

When the touch panel is driven based on the mutual capacitive type, the largest difference from the above self capacitive type is whether voltage application and detection are implemented sequentially or independently.

According to the mutual capacitive type as shown in FIG. 8, first electrodes 211 are aligned in a row direction and second electrodes 212 are aligned in a column direction on a substrate 200, to be alternatively crossed with the first electrodes 211. Driving voltages are applied to the second electrodes 212 in X-axis direction sequentially and sensing voltages are detected from the first electrodes 211 in Y-axis direction sequentially. Different means for the driving and the detecting are independently applied to the electrodes aligned in different directions. As necessary, the driving voltage application and voltage detection may be implemented for the opposite to the above case.

As shown in FIG. 9, the first electrodes 211 are formed in the X-axis and they include first rhombus patterns independently formed from each other, metal connection patterns 215 configured to connect neighboring first rhombus patterns with each other, and a contact hole 216a having electrical contact with the metal connection pattern 215. In this case, the first rhombus patter may be configured of a transparent electrode.

The second electrode 212 includes second rhombus patterns configured of transparent electrodes and connection patterns of integrally-formed transparent electrodes configured to connect the second rhombus patterns with each other, with a thin width.

In an initial state, there may be mutual capacitances (Cm) in crossing areas between neighboring first and second electrodes 211 and 212 and between the connection patterns of the second electrode 212 and the metal connection patterns. When touch is implemented in a predetermined area corresponding to a dotted line area shown in the drawing, a value of the mutual capacitance changes to be smaller and this change is detected to detect whether touch is implemented and to detect a touch location.

The present invention may provide a touch panel applicable to a more-than-medium-sized model by using the touch controller (driving IC) having the limited current pin number. When the touch panel is local dimmed by using at least two touch controllers (the driving ICs), a touch electrode area may be reduced as much as possible such that a touch resolving power and resolution may be improved.

The border area, an electrode area of the border area between the divided driving regions may be smaller than the other regions and touch of the border area happens to be cut. To prevent the cut touch, the routing contact structure configured to the electrodes corresponding to the touch with the touch controllers may be improved to improve touch sensitivity for the border area and the panel outer area.

Together with that, an IC commercialized currently is used to produce more-than-medium-sized touch panels such as a net book and a laptop PC, without waiting until an IC optimized in the more-than-medium-sized model is developed.

The divided driving regions mentioned above may not be limited to the two regions described above and they may be the odd number of at least three divided regions and the even number of at least four divided regions.

Furthermore, the routing line is further formed to read signals of the last touch electrode of the border area and the outer region, like the rhombus pattern touch electrode such that touch sensitivity for the border area between the divided regions may be improved during the divisional driving. Because of that, touch detection may be enabled in the border area and the outer region.

Figure 10:
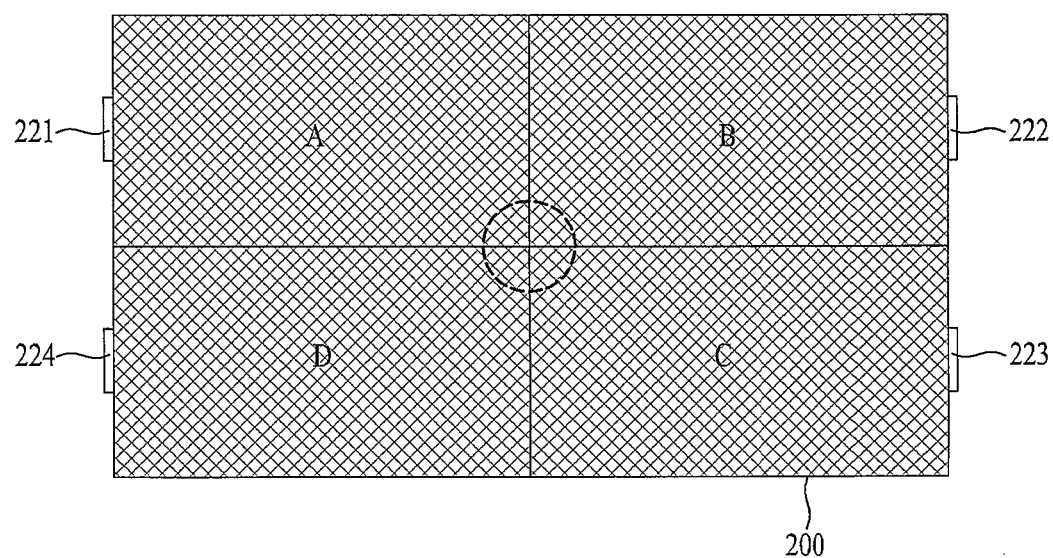
FIG. 10 is a plan view schematically illustrating a touch panel according to a second embodiment of the present invention.
Figure 11:
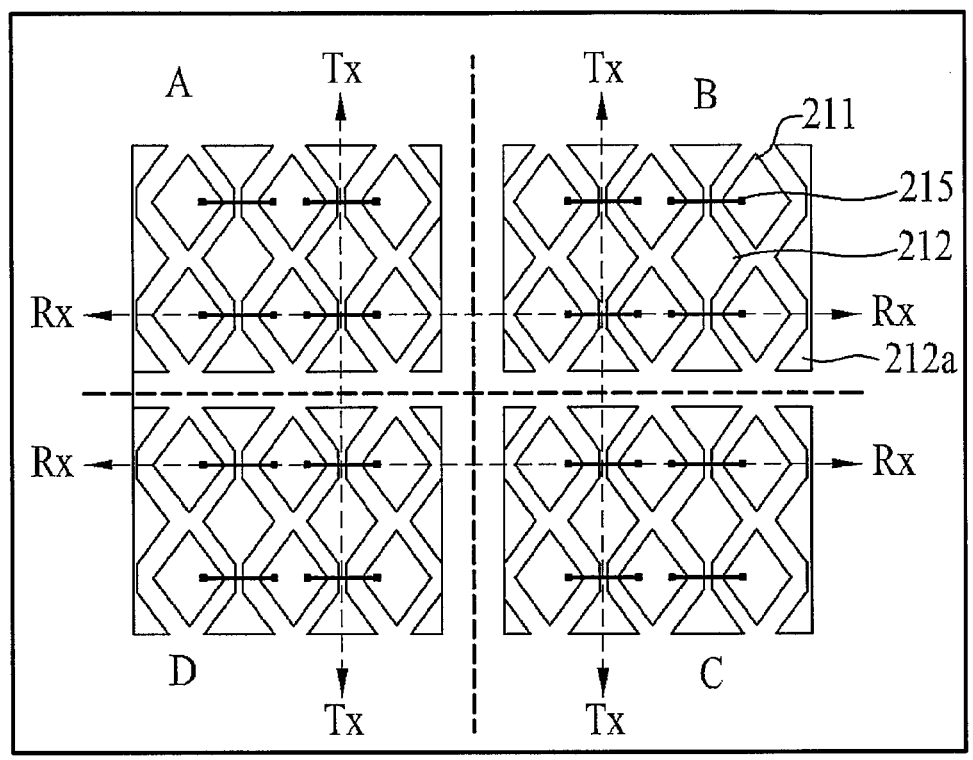
FIG. 11 is a plan view specifically illustrating FIG. 10.

FIG. 10 is a plan view schematically illustrating a touch panel according to a second embodiment of the present invention and FIG. 11 is a plan view specifically illustrating FIG. 10.

According to the second embodiment of the present invention, a configuration of electrodes may be presented to be more proper to the mutual capacitive type. The appearance of the electrodes may be changed into a rhombus pattern in a sensing area, different from the configuration of FIG. 8.

The drawings show four divided regions A, B, C and D. the rhombus pattern in each border area between the regions is divided into a triangle pattern and the triangle pattern is a second electrode border pattern 212a.

Separate FPCs 221, 222, 223 and 224 are provided in the regions, respectively.

In this case, the first electrodes 211 are formed of complete rhombus patterns connected with each other in all of the regions and border areas and outer lines of the first electrodes are corresponding to vertexs of the rhombus pattern, respectively.

Here, oblique sides of first triangle patterns connected with sides of the rhombus pattern of the second electrodes 212 are facing the border areas and the outer regions in an X-axis direction.

In Neighboring border areas and outer areas in an Y-axis direction, the second electrode border pattern 212a includes second triangle patterns spaced apart a predetermined distance from each other, with oblique sides opposed to the border areas and the outer areas, and connection patterns integrally formed with each other to connect the second triangle patterns. In a center of the border areas between neighboring two of A, B and C and D regions, right-triangle pattern having a right included-angle with respect to A, B, C and D regions is formed to be connected with the second triangle patterns.

Here, the first electrodes 211 are electrodes configured to implement sensing in the X-axis direction and the second electrodes 212 are electrodes configured to implement driving voltage application in the Y-axis direction.

The reason why the first electrodes 211 configured to implement sensing is formed of only the rhombus patterns and the connection patterns and why the triangle second electrode border pattern 212a is formed only in the border area configured to apply the driving voltage is that it is subject to the RC time whether the driving voltage is applied and it is subject to difference of mutual capacitives (Cm) whether sensing is implemented. As a result, the first electrode border patterns 211a and the first electrodes 211 configured to apply the driving voltage are adjusted to reduce the distance. The rhombus patterns are uniformly formed in the areas except the border area and the difference of the mutual capacitances is removed.

Compared with the self capacitive type, such the mutual capacitive type detects change of capacitances in areas adjacent to each other. Even if multi-touch is implemented, detection for regions may be implemented without errors.

In the meanwhile, the configuration of the routing line and the pad electrode is identical to the configuration shown in FIGS. 4 and 6 and detailed description will be omitted accordingly.

The touch panel described above may be bonded with a display panel, for example, a liquid crystal panel to be driven according to display implemented in display means.

Figure 12:
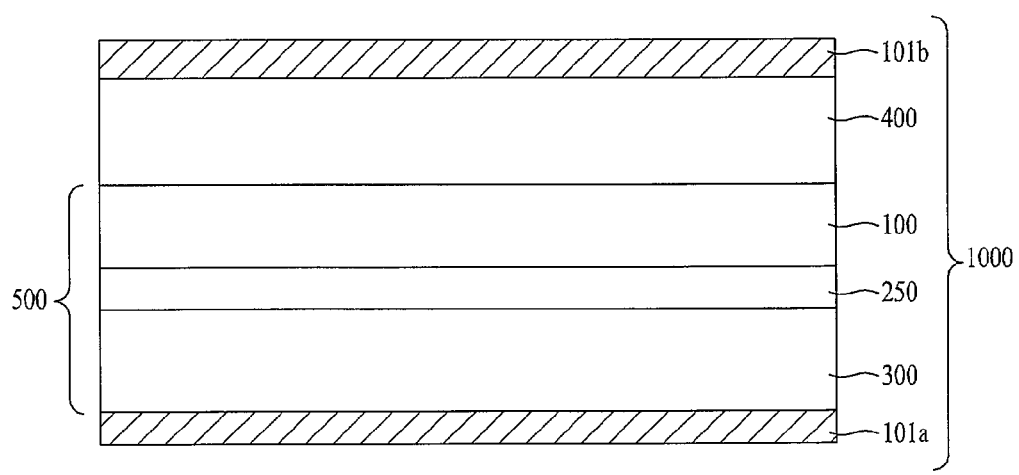
FIG. 12 is a sectional view illustrating a liquid crystal display device including the touch panel according to the present invention.

FIG. 12 is a sectional view illustrating a liquid crystal display device having the touch panel integrally provided therein.

For example, the touch panel described above may be bonded between a liquid crystal panel and an adhesive layer. Alternatively, as shown in FIG. 12, a rear surface of an upper substrate 100 is used as touch panel forming substrate and the touch panel may be formed on a rear surface of a second substrate 100 directly. The latter of the two may be advantageous in an aspect of substrate, work and cost reduction.

That is, the liquid crystal display device 1000 having the touch panel integrally formed therewith includes upper and lower substrates 100 and 300 opposed to each other, a liquid crystal panel 500 configured of a liquid crystal layer 250 injected between the upper and lower substrates 100 and 300, first and second electrodes (111 and 112, see FIG. 4) alternatively aligned to each other on a rear surface of the upper substrate 100, FPCs (140a, 140b and 140c, see FIG. 4) including at least two touch controllers (135a and 135b, see FIG. 4) correspondingly formed in at least two divided regions formed in the upper substrate to control applied signals and detected signals of the first and second electrodes, a routing line 121 configured to connect the at least two FPCs 140a and 140b with the first and second electrodes 111 and 112, and pad electrodes 130a, 130b and 130c connected with the routing line 121 and the at least two touch controllers.

First and second polarizing plates 101a and 101b are attached under the lower substrate 100 and on the touch panel 400, respectively.

Here, a color filter array is formed on an opposed surface of the liquid crystal layer 250 of the upper substrate 100. A black matrix layer (not shown) and a color filter layer (not shown) are formed on the color filter array. As necessary, an overcoat layer or a common electrode may be further formed.

A thin film transistor array is formed on the lower substrate 300 and the thin film transistor array includes gate lines (not shown) and data lines (not shown) alternatively aligned to each other on the lower substrate 300 to define pixel regions, pixel electrodes (not shown) formed in the pixel regions and thin film transistors (not shown) formed in crossing areas between the gate and data lines.

The liquid crystal display device including the touch panel described above may be applicable to a more-than-medium-sized model having the size of 10 inches or more substantially by using divisional driving. Touch resolution and resolving power of the touch panel may be improved by the plurality of the touch controllers (driving IC).

Furthermore, the predetermined pattern divided from the rhombus pattern is provided in the border areas between the divided regions and the outer areas and voltage signals are applied to those pattern electrodes via the pad electrodes. As a result, touch may be detected in all the regions of the substrate.

Actually, to certify driver of window 7 or higher version, the touch resolution and resolving power has to be satisfied. However, the channel number of the touch controller commercialized currently is limited and the single touch controller cannot be proper to lap top PC models or higher models.

As a result, the divisional driving using at least two touch controllers may be expected to improve the touch resolution and resolving power.

A still further, a new routing structure is applied to the border areas of the divided regions in which touch sensitivity is weak during the divisional driving to improve touch sensitivity. As a result, overall touch uniformity of the panel may be satisfactory.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch panel comprising:
   a substrate comprising a plurality of divided regions including a left divided region and a right divided region;
   a plurality of first electrodes, each of the first electrodes comprising first rhombus patterns spaced apart a predetermined distance from each other in a predetermined first direction and first connection patterns configured to connect the first rhombus patterns adjacent on the substrate, the plurality of first electrodes aligned in a second direction crossing the first direction;
   a plurality of second electrodes, each of the second electrodes comprising second rhombus patterns spaced apart a predetermined distance from each other in the second direction and second connection patterns configured to connect the second rhombus patterns adjacent, the plurality of second electrodes aligned in the first direction;
   a plurality of third electrodes formed in the left and right divided regions, and adjacent to a vertical line between the left and right divided regions, each of the third electrodes formed of triangle patterns connected with each other, each of the triangle patterns of the third electrodes including a vertical electrode edge, and two oblique electrode edges, the vertical electrode edges of the triangle patterns of the third electrodes being adjacent and parallel to the vertical line between the left and right divided regions;
   a first touch controller configured to detect touch signals on the first, second, and third electrodes formed in the left divided region;
   a second touch controller configured to detect touch signals on the first, second, and third electrodes formed in the right divided region independently from the first touch controller of the left divided region;
   a plurality of pad electrodes connected with the touch controller, the pad electrodes formed correspondingly to the first electrodes, the second electrodes and the third electrodes formed in the divided regions of the substrate, the plurality of pad electrodes including a left pad electrode and a right pad electrode, the left pad electrode being commonly connected to the vertical electrode edges of all of the triangle patterns of the third electrodes in the left divided region, and the right pad electrode being commonly connected to the vertical electrode edges of all of the triangle patterns of the third electrodes in the right divided region;
   a first routing line connected with one of the pad electrodes from a corner of a first rhombus pattern located in an end of each of the first electrodes aligned in the first direction;
   a second routing line connected with one of the pad electrodes from a corner of a second rhombus pattern located in an end of each of the second electrodes aligned in the second direction; and third routing lines respectively connected with ends of the third electrodes, the third routing lines being connected with vertices of the triangle pattern located in the ends of the third electrodes, wherein a first third electrode of the plurality of third electrodes formed in the left divided region is immediately adjacent to a second third electrode of the plurality of third electrodes formed in the right divided region, wherein a first third routing line is connected with an end of the first third electrode, and a second third routing line is connected with an end of the second third electrode, wherein the first third routing line and the second third routing line are disposed immediately adjacent to each other with respect to the vertical line; and wherein the disposal of the first third routing line sand the second third routing line immediately adjacent to each other with respect to the vertical line removes a dead zone in the third electrodes in which a touch is not detected.

2. The touch panel of claim 1, wherein the first connection patterns are integrally formed with the first rhombus patterns; and the second connection patterns are metal patterns located in a different layer from the second rhombus patterns.

3. The touch panel of claim 2, wherein the first rhombus patterns and the first connection patterns of the first electrodes, and the second rhombus patterns of the second electrodes are formed of transparent electrodes.

4. The touch panel of claim 1, wherein the first rhombus pattern and the second rhombus pattern have diagonal lines smaller than a critical value of a contact area when touch is generated, respectively.

5. The touch panel of claim 4, wherein the first rhombus pattern and the second rhombus pattern have diagonal lines of 1 cm or less, respectively.

6. The touch panel of claim 1, wherein the touch controller applies voltage signals to the first electrodes and the second electrodes sequentially in the divided region and detects change of voltage values to detect an area having a changed voltage value to be touched.

7. The touch panel of claim 1, wherein the touch controller applies driving voltages to the first electrodes and detects voltage signals from the second electrodes to detect touch and a touch point according to the detected change of the voltage signal.

8. The touch panel of claim 1, wherein the third electrodes are formed in parallel to the first electrodes.

9. The touch panel of claim 8, wherein the third electrodes are configured of triangle patterns spaced apart a predetermined distance from each other in a predetermined first direction in first and second regions adjacent to the border areas, with oblique sides opposed to the border areas and connection patterns integrally formed with each other to connect the triangle patterns with each other.

10. The touch panel of claim 1, wherein the second electrodes are configured to receive driving voltages applied thereto, and the first electrodes are configured to have sensing voltages detected therefrom.

11. A liquid crystal display device comprising:

a liquid crystal panel comprising first and second substrates opposed to each other, with a liquid crystal layer filled between the first and second substrates;

a substrate comprising a plurality of divided regions including a left divided region and a right divided region;

a plurality of first electrodes, each of the first electrodes comprising first rhombus patterns spaced apart a predetermined distance from each other in a predetermined first direction and first connection patterns configured to connect the first rhombus patterns adjacent, the plurality of first electrodes aligned in a second direction crossing the first direction on a rear surface of the second substrate;

a plurality of second electrodes, each of the second electrodes comprising second rhombus patterns spaced apart a predetermined distance from each other in the second direction and second connection patterns configured to connect the second rhombus patterns adjacent, the plurality of second electrodes aligned in the first direction on the rear surface of the second substrate;

a plurality of third electrodes formed in the left and right divided regions, and adjacent to a vertical line between the left and right divided regions, each of the third electrodes formed of triangle patterns connected with each other, each of the triangle patterns of the third electrodes including a vertical electrode edge, and two oblique electrode edges, the vertical electrode edges of the triangle patterns of the third electrodes being adjacent and parallel to the vertical line between the left and right divided regions;

a first touch controller configured to detect touch signals on the first, second, and third electrodes formed in the left divided region;

a second touch controller configured to detect touch signals on the first, second, and third electrodes formed in the right divided region independently from the first touch controller of the left divided region;

a plurality of pad electrodes connected with the touch controller, the pad electrodes formed correspondingly to the first electrodes, the second electrodes and the third electrodes formed in the divided regions of the substrate, the plurality of pad electrodes including a left pad electrode and a right pad electrode, the left pad electrode being commonly connected to the vertical electrode edges of all of the triangle patterns of the third electrodes in the left divided region, and the right pad electrode being commonly connected to the vertical electrode edges of all of the triangle patterns of the third electrodes in the right divided region;

a first routing line connected with one of the pad electrodes from a corner of a first rhombus pattern located in an end of each of the first electrodes aligned in the first direction;

a second routing line connected with one of the pad electrodes from a corner of a second rhombus pattern located in an end of each of the second electrodes aligned in the second direction; and third routing lines respectively connected with ends of the third electrodes, the third routing lines being connected with vertices of the triangle pattern located in the ends of the third electrodes, wherein a first third electrode of the plurality of third electrodes formed in the left divided region is immediately adjacent to a second third electrode of the plurality of third electrodes formed in the right divided region, wherein a first third routing line is connected with an end of the first third electrode, and a second third routing line is connected with an end of the second third electrode, wherein the first third routing line and the second third routing line are disposed immediately adjacent to each other with respect to the vertical line; and wherein the disposal of the first third routing line sand the second third routing line immediately adjacent to each other with respect to the vertical line removes a dead zone in the third electrodes in which a touch is not detected.

* * * * *